US012612125B2

(12) United States Patent
Collins et al.

(10) Patent No.: US 12,612,125 B2
(45) Date of Patent: Apr. 28, 2026

(54) TRACK TENSIONING SYSTEM

(71) Applicant: THE DYNAMIC ENGINEERING SOLUTION PTY LTD, Holden Hill (AU)

(72) Inventors: Andrew Collins, Holden Hill (AU); Andrew Loizides, Holden Hill (AU)

(73) Assignee: THE DYNAMIC ENGINEERING SOLUTION PTY LTD, Holden Hill (AU)

( * ) Notice: Subject to any disclaimer, the term of this patent is extended or adjusted under 35 U.S.C. 154(b) by 484 days.

(21) Appl. No.: 18/023,330

(22) PCT Filed: Aug. 25, 2021

(86) PCT No.: PCT/AU2021/050967
§ 371 (c)(1),
(2) Date: Feb. 24, 2023

(87) PCT Pub. No.: WO2022/040739
PCT Pub. Date: Mar. 3, 2022

(65) Prior Publication Data
US 2023/0322314 A1      Oct. 12, 2023

(30) Foreign Application Priority Data
Aug. 25, 2020    (AU) ................................. 2020903039

(51) Int. Cl.
B62D 55/30        (2006.01)
F15B 15/26        (2006.01)
F16H 7/08         (2006.01)

(52) U.S. Cl.
CPC .............. B62D 55/30 (2013.01); F15B 15/26 (2013.01); F16H 7/08 (2013.01)

(58) Field of Classification Search
CPC ....... B62D 55/30; B62D 55/305; F15B 15/26; F15B 15/261; F16H 7/08
See application file for complete search history.

(56) References Cited

U.S. PATENT DOCUMENTS 4,247,082 A  *   1/1981   Sjolund .................... B66F 3/30
                                                            92/136
4,893,883 A      1/1990   Satzler
5,254,047 A     10/1993   Anderson

FOREIGN PATENT DOCUMENTS

CN          105966480 A      9/2016
DE            3232322 A1      3/1981
(Continued)

OTHER PUBLICATIONS

English translation of DE 3232322.*

*Primary Examiner* — S. Joseph Morano
*Assistant Examiner* — Alex Palmer
(74) *Attorney, Agent, or Firm* — Maschoff Brennan

(57) ABSTRACT

A track tensioning system for adjusting tension in a vehicle track includes a track tensioner with a hydraulic cylinder and a piston assembly slidably moveable within the cylinder and dividing the cylinder into a first and second chamber. Each is in selective fluid communication with a pressurised hydraulic fluid source and reservoir. Supply or withdrawal of hydraulic fluid to or from the chambers causes the piston assembly to move within the cylinder in either extension. A locking system is capable of mechanically locking the position of the piston assembly with respect to the hydraulic cylinder. The locking system is switchable between an engaged mode and a disengaged mode.

19 Claims, 8 Drawing Sheets

(56)        References Cited

FOREIGN PATENT DOCUMENTS

EP          1647722  A1      4/2006
KR          20060013488  A   *   2/2006   ................ B66F 3/30

* cited by examiner

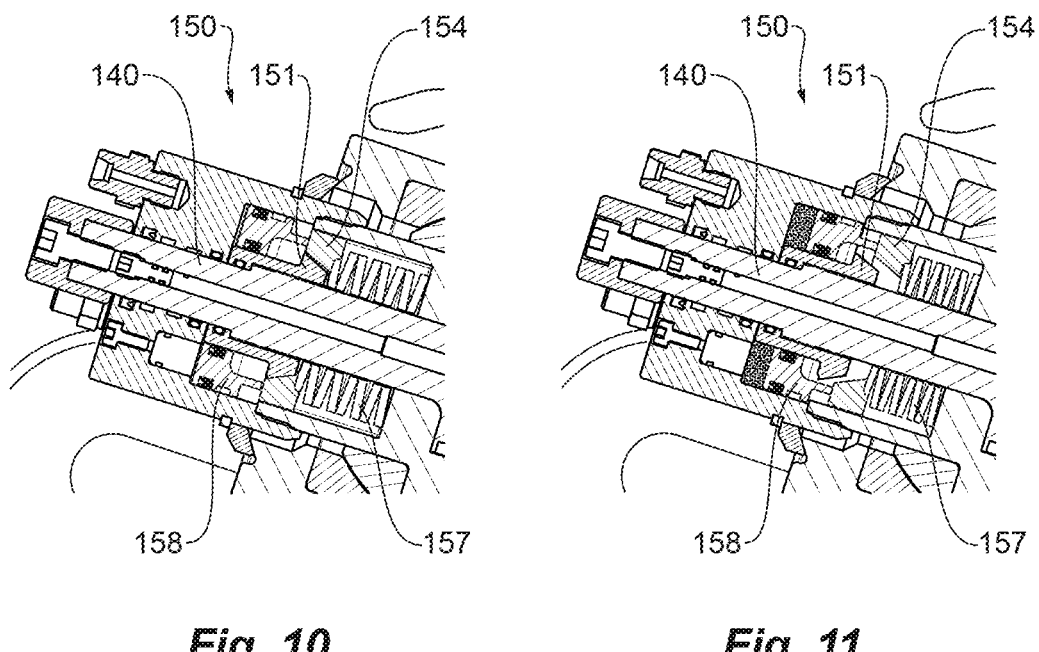
Fig. 10                Fig. 11
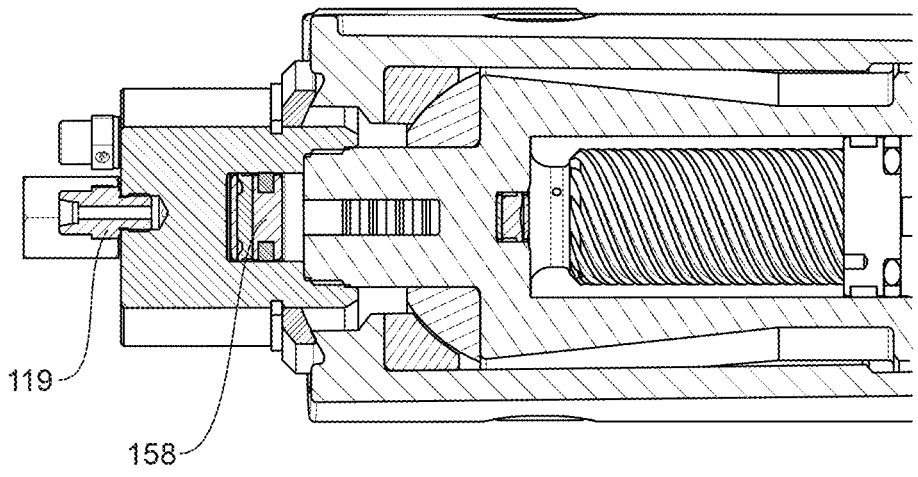
Fig. 12

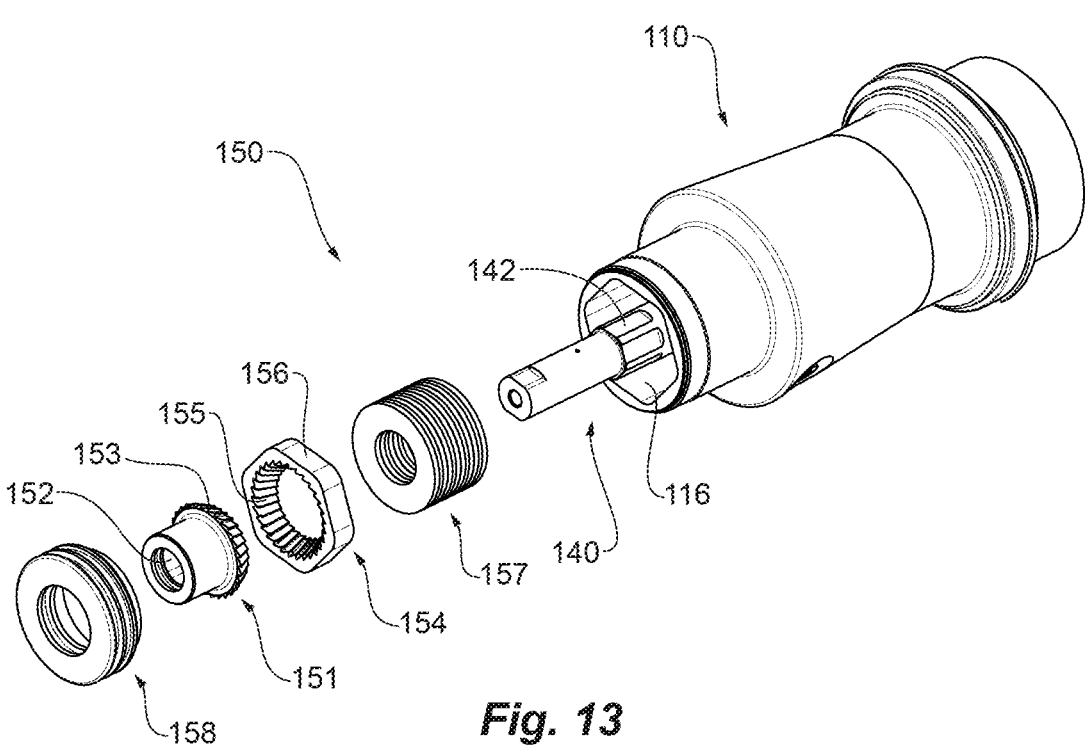
Fig. 13
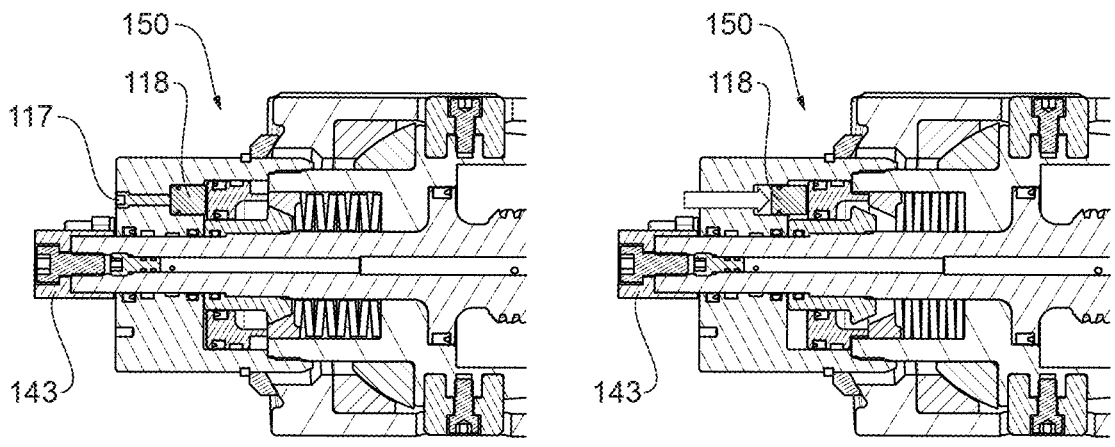
Fig. 14                    Fig. 15

Performing an extension

| Order of operations | | | | | | | | |
|---|---|---|---|---|---|---|---|---|
| Disengaging the clutch | | | | Extension | Engaging the clutch | | | |
| 0 | 1 | 2 | 3 | 4 | 3 | 2 | 1 | 0 |

Performing a retraction

| Order of operations | | | | | | | | |
|---|---|---|---|---|---|---|---|---|
| Disengaging the clutch | | | | Retraction | Engaging the clutch | | | |
| 0 | 1 | 2 | 3 | 5 | 3 | 2 | 1 | 0 |

Track relaxing for maintenance

| Order of operations | | | | | | | | | |
|---|---|---|---|---|---|---|---|---|---|
| Disengaging the clutch | | | | Retraction | Complete retraction | Engaging the clutch | | | |
| 0 | 1 | 2 | 3 | 5 | 6 | 3 | 2 | 1 | 0 |

*Fig. 16*

TRACK TENSIONING SYSTEM

PRIORITY DOCUMENT

The present application claims priority from Australian Provisional Patent Application No. 2020903039 titled "TRACK TENSIONING SYSTEM" and filed on 25 Aug. 2020, the content of which is hereby incorporated by reference in its entirety.

TECHNICAL FIELD

The present invention relates to a track tensioning system for a tracked vehicle. In a particular form the present invention relates to a hydraulic track tensioning system for a tracked vehicle with a mechanical lock.

BACKGROUND

Tracked vehicles use a continuous track comprising a continuous band of treads or track plates entrained about one or more driven rollers or sprockets, front and rear idler rollers and a plurality of track rollers. The one or more driven rollers are driven by the vehicle engine which in turn causes the continuous track to be advanced around each of the front and rear idler rollers and track rollers to move the tracked vehicle in either a forward or reverse direction.

For the continuous track to function properly, it must be appropriately tensioned around the rollers. If not tight enough, the track can swing side to side, whip and/or not properly engage with the rollers, affecting handling and increasing wear on components. It is also possible for the track to derail entirely. If too tight, there is increased wear on components as a result of increased frictional forces burdening the drive train, causing mechanical loss and increasing temperature.

There are also reasons why it might be necessary to adjust the tension of the track dependent on operating conditions, such as changes in payload weight or changes in terrain, where in soft conditions, slacker tracks may be used and in harder conditions, tighter tracks may be used.

It is against this background that the present disclosure has been developed.

SUMMARY

According to a first aspect, there is provided a track tensioning system for adjusting tension in a vehicle track, the system comprising a track tensioner comprising a hydraulic cylinder and a piston assembly slidably moveable within the cylinder and dividing the cylinder into a first and second chamber each in selective fluid communication with a pressurised hydraulic fluid source and reservoir, such that supply or withdrawal of hydraulic fluid to or from the chambers causes the piston assembly to move within the cylinder in either extension, increasing track tension, or retraction, decreasing track tension, the tensioner further comprising a locking system capable of mechanically locking the position of the piston assembly with respect to the hydraulic cylinder, wherein the locking system is switchable between an engaged mode, where it prevents movement of the piston, thereby maintaining tension in the vehicle track, and a disengaged mode, where it allows movement of the piston, thereby allowing tension in the vehicle track to be adjusted.

In one form, the piston assembly further comprises a piston rod having a first end connected with respect to the piston and a second end connected with respect to a tensioning apparatus configured to bear against the vehicle track.

In one form, the track tensioning system further comprises a locking spindle rotatably secured with respect to the hydraulic cylinder and in mechanical engagement with the piston assembly, wherein movement of the piston assembly in extension causes the locking spindle to rotate in a first direction and movement of the piston assembly in retraction causes the locking spindle to rotate in a second direction, and wherein the locking system selectively prevents and allows rotation of the locking spindle, thereby preventing and allowing movement of the piston assembly.

In one form, the locking spindle is in threaded engagement with the piston assembly by virtue of a threaded external section on the locking spindle and a threaded internal section in an internal bore of the piston assembly.

In one form, the locking system comprises a clutch assembly moveable between an engaged position, preventing rotation of the locking spindle and a disengaged position, allowing rotation of the locking spindle.

In one form, the clutch assembly comprises a first portion and a second portion, wherein the first portion is secured to and configured to rotate with the locking spindle and the second portion is prevented from rotating and moveable between engaged and disengaged positions, wherein when the first and second portions are engaged, the locking spindle is prevented from rotating, and when the internal and external portions are disengaged, the locking spindle is allowed to rotate.

In one form, the clutch assembly further comprises a biasing means, wherein the second portion is biased into mechanical engagement with the internal portion by the biasing means.

In one form, the first and second portions each comprise opposing teeth, configured to interengage and prevent relative rotation of the first and second components.

In one form, the clutch assembly is in selective fluid communication with the pressurised hydraulic fluid source and reservoir, such that supply and withdrawal of hydraulic fluid to or from the clutch assembly cause the clutch assembly to disengage and engage respectively.

In one form, the locking spindle further comprises an external engagement portion, wherein the external engagement portion can be rotated to manually extend or retract the piston assembly.

In one form, the axis of rotation of the locking spindle and the direction of movement of the piston assembly are coincident.

BRIEF DESCRIPTION OF DRAWINGS

Embodiments of the present invention will be discussed with reference to the accompanying drawings wherein:

FIG. 10 is a detailed cross-sectional view of the hydraulic track tensioner of FIG. 2, detailing the clutch in an engaged position;

FIG. 11 is a detailed cross-sectional view of the hydraulic track tensioner of FIG. 2, detailing the clutch in a hydraulically disengaged position;

FIG. 12 is a cross-sectional view of the hydraulic track tensioner of FIG. 2, detailing the third hydraulic connection for the clutch;

FIG. 13 is an exploded view of components of the clutch;

FIG. 14 is a detailed cross-sectional view of the hydraulic track tensioner of FIG. 2, detailing the clutch in an engaged position;

FIG. 15 is a detailed cross-sectional view of the hydraulic track tensioner of FIG. 2, detailing the clutch in a manually disengaged position; and FIG. 16 provides flow diagrams detailing the order of operations for performing an extension, retraction and over-retraction of the hydraulic track tensioner.

DESCRIPTION OF EMBODIMENTS

Figure 1:
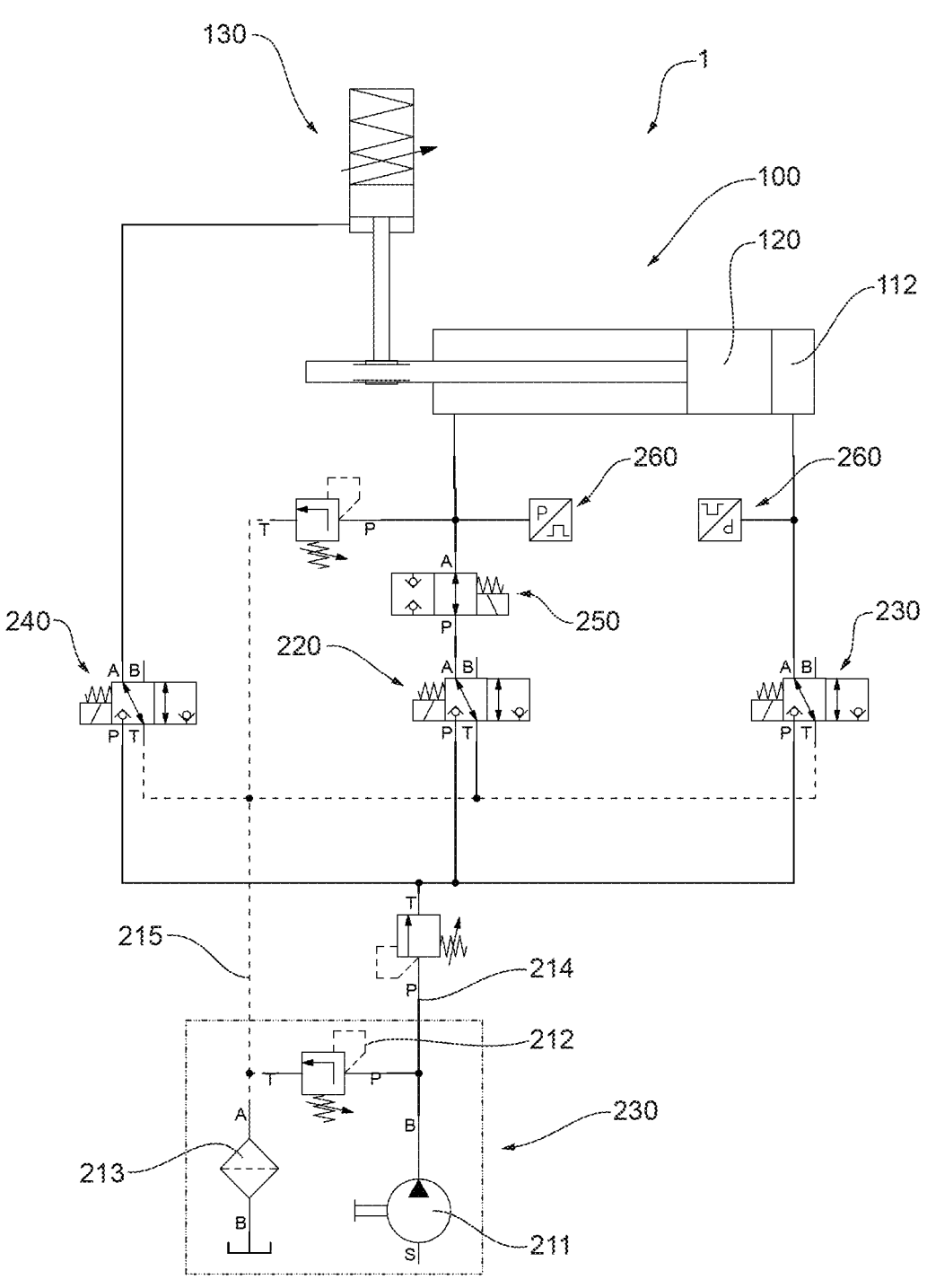
FIG. 1 is a schematic of a hydraulic track tensioning system, according to an embodiment.
Figure 2:
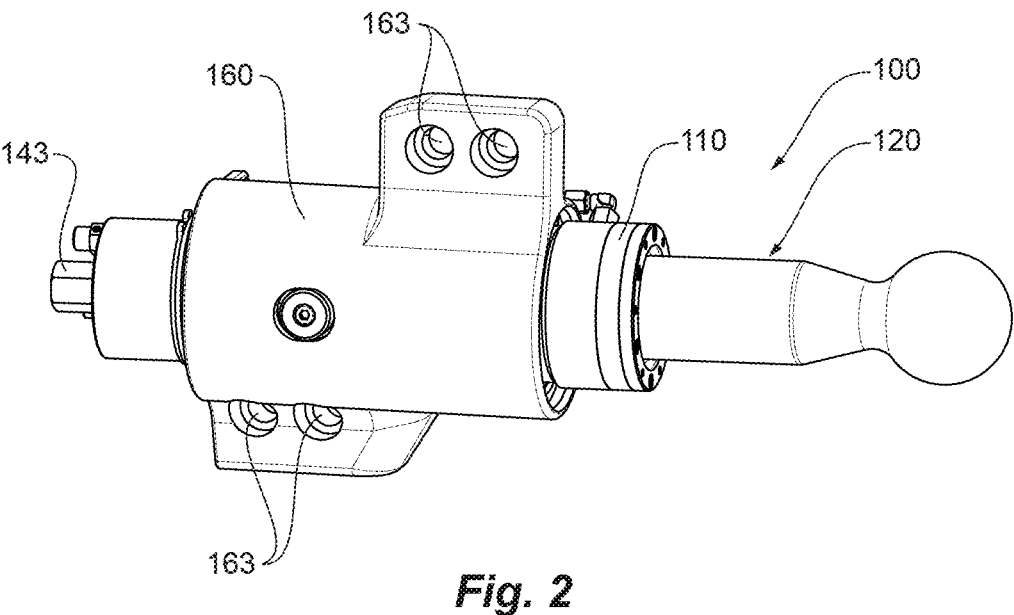
FIG. 2 is a side perspective view of a hydraulic track tensioner, according to an embodiment.

Referring now to FIG. 1, there is shown a schematic of a hydraulic track tensioning system 1, according to an embodiment. The system 1 comprises a hydraulic track tensioner 100 comprising a hydraulic cylinder 110 and a piston assembly 120 slidably moveable within the cylinder 110 and dividing the cylinder 110 into a first and second chamber 111, 112. Both the first and second chambers 111, 112 are in selective fluid communication with a pressurised hydraulic fluid source and reservoir, such that supply or withdrawal of hydraulic fluid to or from the chambers 111, 112 causes the piston assembly 120 to move within the cylinder 110 in either extension, increasing track tension, or retraction, decreasing track tension. It will be appreciated that the piston assembly 120 may be connected to a tensioning apparatus such as an idler roller, tensioning arm, or similar where extension of the piston assembly 120 causes the tensioning apparatus to bear against and increase tension in the vehicle track, and where retraction of the piston assembly 120 causes the roller or tensioning arm to retract from and decrease tension in the vehicle track.

The hydraulic track tensioner 100 is also capable of mechanically locking the position of the piston assembly 120 with respect to the hydraulic cylinder 110 by virtue of a locking system 130 (shown schematically in FIG. 1) being switchable between an engaged mode, where it prevents movement of the piston assembly 120, thereby maintaining tension in the vehicle track, and a disengaged mode, where it allows movement of the piston assembly 120, thereby allowing tension in the vehicle track to be adjusted.

Referring now to FIGS. 2 to 15, where there is shown a hydraulic track tensioner 100 according to an embodiment. As previously described, the tensioner 100 comprises the hydraulic cylinder 110 and piston assembly 120, and also features an external housing 160 via which it may be mounted to a vehicle via bolt holes 163. As best seen in FIG. 4, the hydraulic cylinder 110 is connected to the external housing 160 via a spherical bearing 161 and retainer 162, allowing the cylinder 110 to be adjustably positioned with respect to the external housing 160 in order to correctly align the tensioner 100 with the vehicle track.

The locking system 130 works by virtue of a leadscrew arrangement between the piston assembly and a locking spindle 140. The piston assembly 120 features an internal bore 123 with an internally threaded section 124 and the locking spindle 140 features an externally threaded section 141, whereby the threaded sections of the piston assembly 120 and locking spindle 140 engage in a leadscrew arrangement where the axis of rotation of the locking spindle 140 is coincident with the direction of movement of the piston assembly 120. The locking spindle 140 is rotatably secured within the cylinder 110 and prevented from moving along the length of the cylinder 110 by virtue of a collar 144 and hex end 143. The piston assembly 120 is prevented from rotating with respect to the cylinder 110 by virtue of its engagement with the tensioning apparatus.

Figure 8:
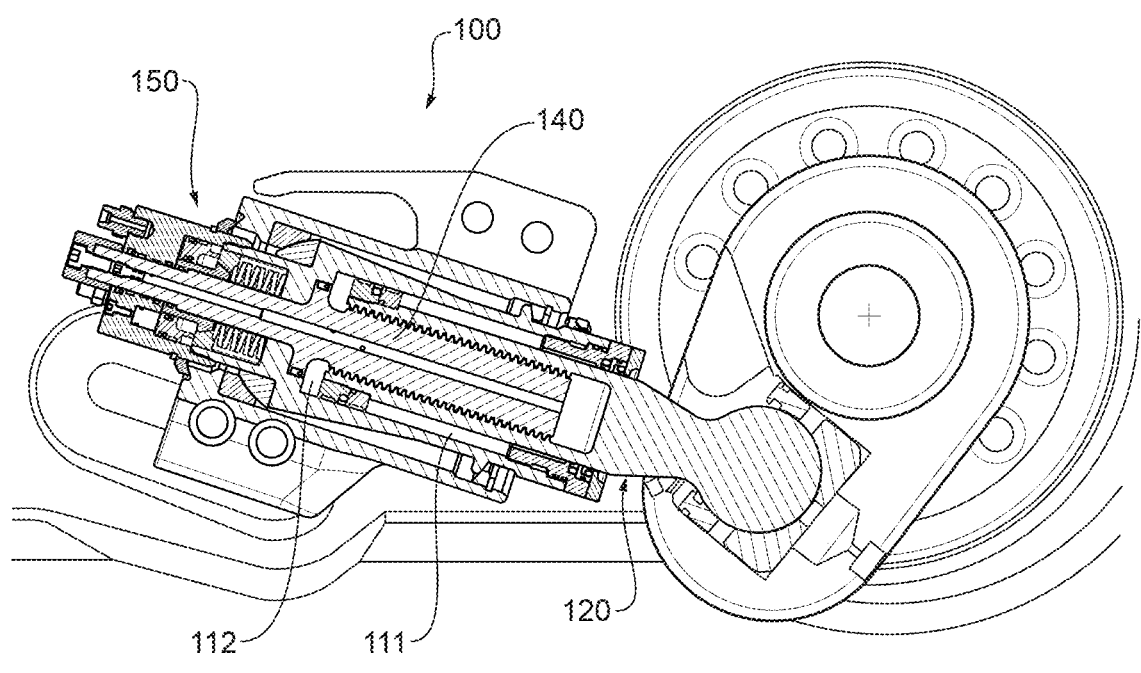
FIG. 8 is a cross-sectional view of the hydraulic track tensioner of FIG. 2 undergoing extension.
Figure 9:
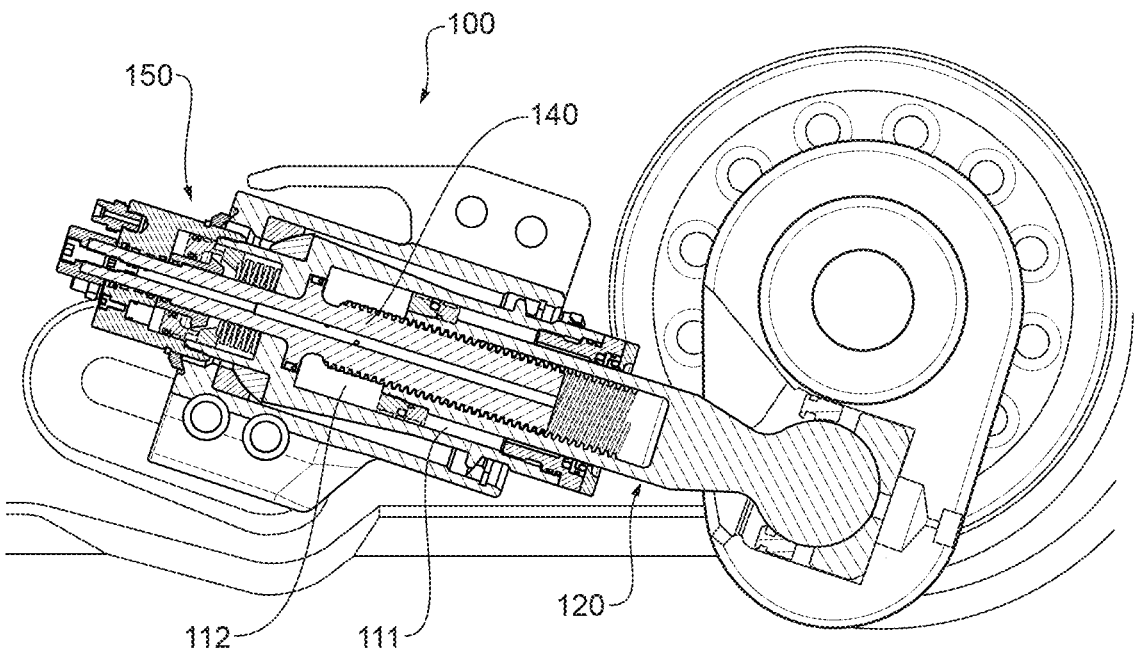
FIG. 9 is a cross-sectional view of the hydraulic track tensioner of FIG. 2 undergoing retraction.

With reference to FIG. 8, showing a cross-sectional view of the track tensioner 100 undergoing extension, it will be appreciated that as hydraulic fluid is supplied to the second chamber 112 and allowed to drain from the first chamber 111, the piston assembly 120 is extended with sufficient force that it is driven along the locking spindle 140, causing the locking spindle 140 to rotate in a first direction by virtue of the fact that the piston assembly 120 is prevented from rotating. Conversely, with reference to FIG. 9, showing a cross-sectional view of the track tensioner 100 undergoing retraction, it will be appreciated that as hydraulic fluid is supplied to the first chamber 111 and allowed to drain from the second chamber 112, the piston assembly 120 is retracted with sufficient force that it is driven along the locking spindle 140, causing the locking spindle 140 to rotate in a second direction.

As will be described in further detail below, the locking system 130 works by selectively engaging with and disengaging from the locking spindle 140, thereby selectively preventing and allowing rotation of the locking spindle 140 and consequently preventing and allowing movement of the piston assembly 120. In order to achieve this, the locking system 130 comprises a clutch assembly 150 (as best shown in FIGS. 10 to 15) comprising a first, internal portion 151, a second, external portion 154 and a biasing means in the form of a return spring 157. It can be seen that the internal portion 151 features a hexagonal internal bore 152 configured to engage with a similarly hexagonal section 142 of the locking spindle 140, such that the internal portion 151 rotates with the locking spindle 140. The internal portion 151 also comprises externally cut teeth 153 configured to engage with complimentarily cut internal teeth 155 on the external portion 154. The external portion 154 has a hexagonally shaped outer profile 156 configured to engage with a similarly hexagonal inner bore 116 of the track tensioner 100, thereby preventing rotation of the external portion 154. The return spring 157 is configured to bear against the external portion 154 such that it engages with the inner portion 151, preventing relative rotation of the inner and external portions, and therefore rotation of the locking spindle 140 as shown in FIG. 10.

The clutch assembly 150 is also in selective fluid communication with the pressurised hydraulic fluid source and tank, and features a clutch piston 158 configured to bear against the external portion 154, such that supply of hydraulic fluid to the clutch assembly 150 pushes the clutch piston 158 against the external portion 154, causing the external portion 154 to push against and compress the return spring 157, such that the teeth of the internal and external portions 151, 154 disengage (as shown in FIG. 11) allowing the internal portion 151 and the locking spindle 140 to rotate.

While the hydraulic track tensioner 100 is typically adjusted using hydraulic fluid, it is also capable of being manually adjusted, for instance, in the event of a hydraulic failure. Referring to FIGS. 14 and 15, it can be seen that a series of screws 117 may be removed and replaced with longer screws, which are then wound against pins 118 that evenly push against the clutch piston 158, releasing the clutch. The hex 143 on the end of the locking spindle 140 can then be used to rotate the locking spindle 140 in order to extend or retract the tensioner 100 using a wrench or similar.

With reference to FIG. 1, it can be seen that the pressurised fluid source is in the form of a pump assembly 210 comprising a hydraulic pump 211, and pressure relief valve 212 connecting the hydraulic pump to the reservoir 213. The pump assembly 210 also features a high pressure outlet 214 for supplying high pressure fluid to the tensioner 100 and a low pressure inlet 215 for receiving low pressure fluid return to the pump assembly 210 by the tensioner 100.

Figure 3:
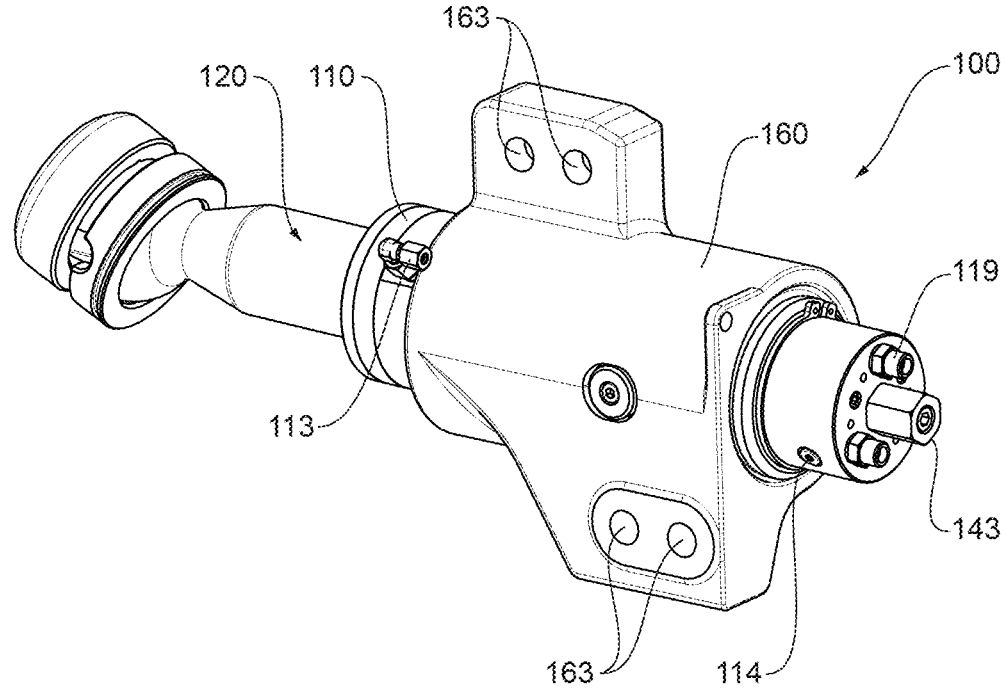
FIG. 3 is a rear perspective view of the hydraulic track tensioner of FIG. 2.
Figures 4, 5:
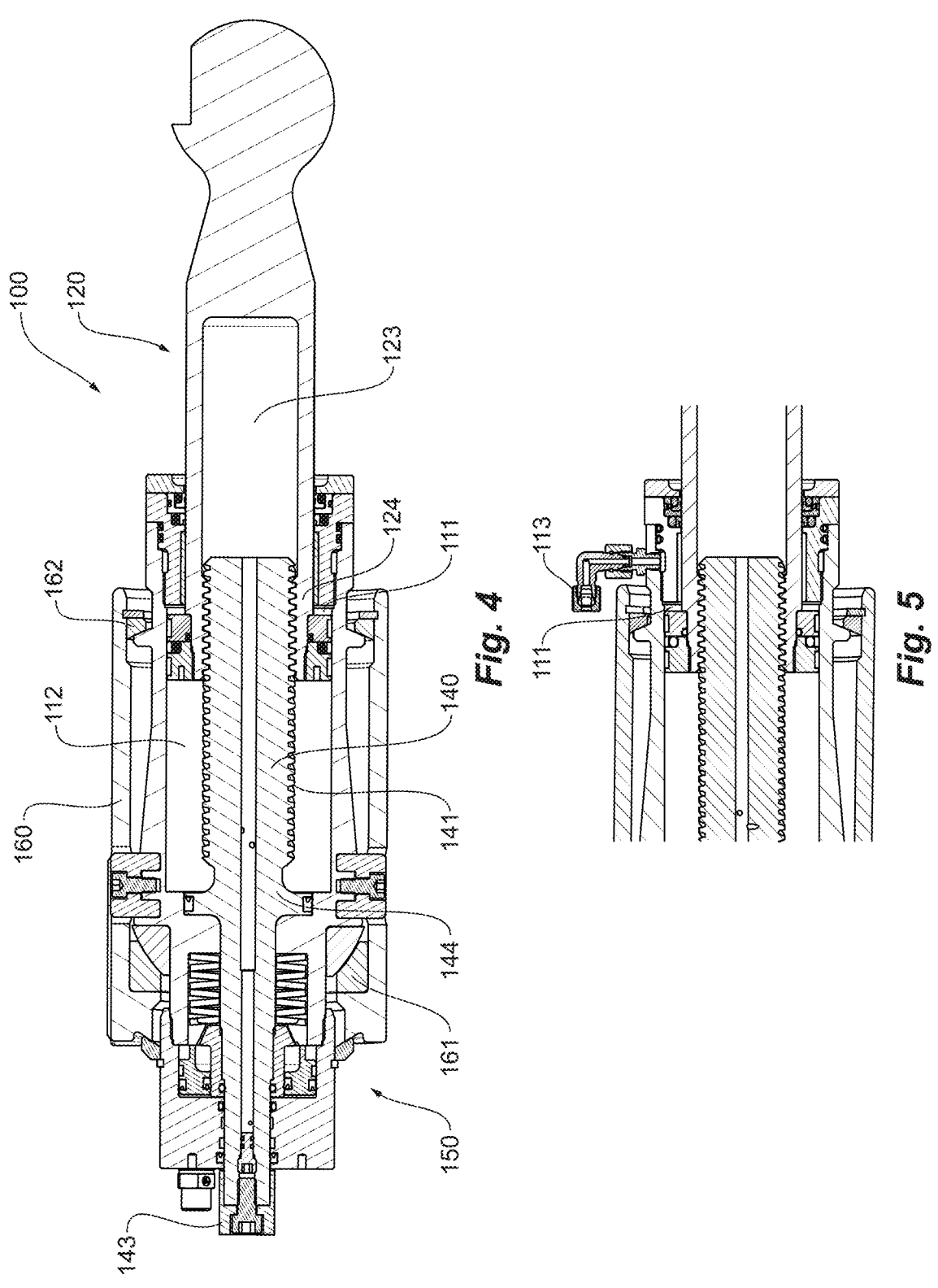
FIG. 4 is a cross-sectional view of the hydraulic track tensioner of FIG. 2.
FIG. 5 is a cross-sectional view of the hydraulic track tensioner of FIG. 2, detailing the first hydraulic connection.
Figure 6:
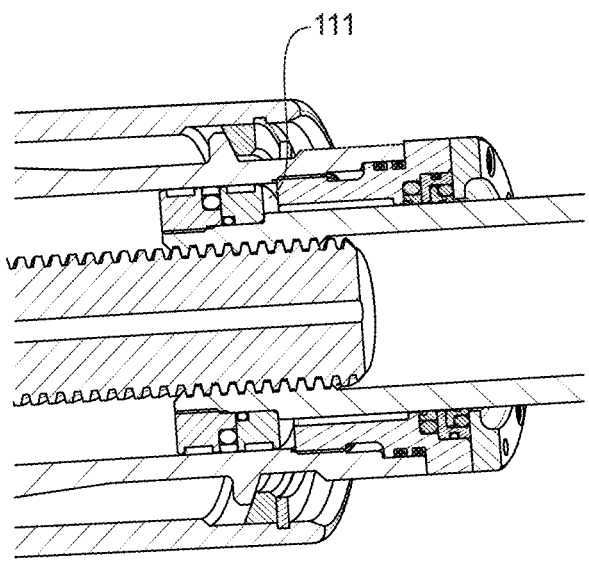
FIG. 6 is a cross-sectional view of the hydraulic track tensioner of FIG. 2, detailing the hydraulic flow path from the first hydraulic connection to the first chamber.

With reference to FIGS. 3, 5 and 6, it can be seen that the track tensioner 100 features a first hydraulic connection 113 for hydraulically connecting the first chamber 111 to the pump assembly 210. As shown in FIG. 1, the first chamber 111 is hydraulically connected to the pump assembly 210 via a first switching valve 220. The first switching valve 220 is a 3/2 solenoid with spring return. In the spring return position, the first switching valve 220 connects the first chamber 111 to the reservoir 213 via the low pressure inlet 215. In the solenoid active position, the first switching valve 220 connects the first chamber to the pump 211 via the high pressure outlet 214. In between the first switching valve 220 and the first chamber 111 is a locking valve 250. The locking valve 250 is a 2/2 solenoid with spring return. In the spring return position, the locking valve 250 is open, allowing fluid to flow to and from the first chamber 111. In the solenoid active position, the locking valve 250 is closed, preventing fluid flow to and from the first chamber 111.

Figure 7:
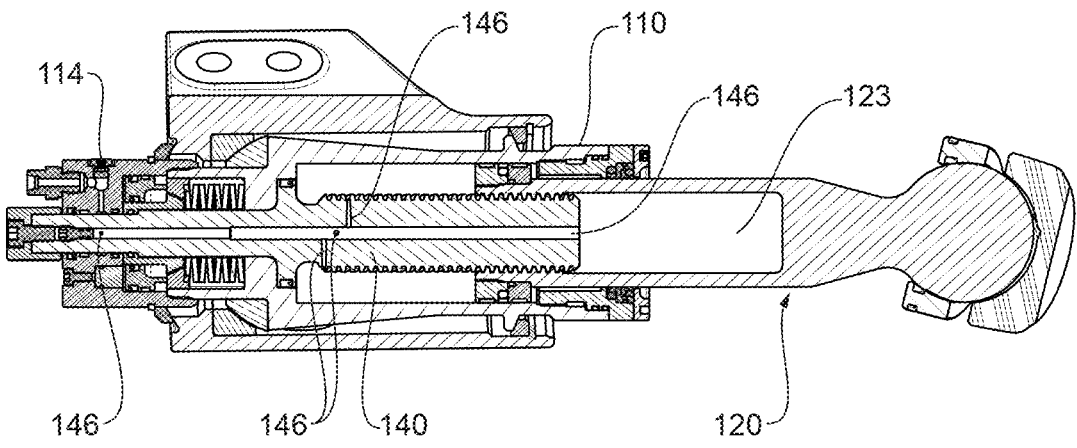
FIG. 7 is a cross-sectional view of the hydraulic track tensioner of FIG. 2, detailing the hydraulic connection and hydraulic flow path from the second hydraulic connection to the second chamber.

With reference to FIGS. 3 and 7, it can be seen that the track tensioner 100 features a second hydraulic connection 114 for hydraulically connecting the second chamber 112 to the pump assembly 210. With specific reference to FIG. 7, it can be seen that the locking spindle 140 carries hydraulic fluid between the second chamber 112 and the second hydraulic connection 114 via an internal bore 145 and apertures 146 provided within the locking spindle 140. As can also be seen in FIGS. 4 and 7, hydraulic fluid is also provided to the internal bore 123 of the piston assembly 120, such that when hydraulic fluid is supplied to the second chamber 112 it is also supplied to the internal bore 123 of the piston assembly 120, increasing the available surface area for the hydraulic fluid to bear against during an extension operation. As shown in FIG. 1, the second chamber 112 is hydraulically connected to the pump assembly 210 via a second switching valve 230. The second switching valve 230 is a 3/2 solenoid with spring return. In the spring return position, the second switching valve 230 connects the second chamber 112 to the reservoir 213 via the low pressure inlet 215. In the solenoid active position, the second switching valve 230 connects the second chamber 112 to the pump 211 via the high pressure outlet 214.

While in the embodiment shown, hydraulic fluid flows between the second hydraulic connection 114 and the second chamber 112 and internal bore 123 of the piston assembly 120 via the internal bore 145 in the locking spindle 140, it will be appreciated that other means of hydraulically connecting the second chamber 112 to the pump assembly 210 will also be acceptable. For instance, a hydraulic connection could be supplied to a sidewall of the hydraulic cylinder 110 and directly into the second chamber 112.

With reference to FIGS. 3 and 12, it can be seen that the track tensioner 100 features a third hydraulic connection 119 for hydraulically connecting the clutch assembly 150 to the pump assembly 210. As shown in FIG. 1, the clutch assembly 150 is hydraulically connected to the pump assembly 210 via a third switching valve 240. The third switching valve 240 is a 3/2 solenoid with spring return. In the spring return position, the third switching valve 240 connects the clutch assembly 150 to the reservoir 213 via the lower pressure inlet 215. In the solenoid active position, the third switching valve 240 connects the clutch assembly 150 to the pump 211 via the high pressure outlet 214.

The system also features pressure sensors 260 used to detect pressure in the first and second chambers 111, 112. It will be appreciated that these can also be used to determine vehicle track tension.

Operation of the hydraulic track tensioner 100 will now be described, with particular reference to FIG. 1. The track tensioner 100 can be thought of having seven operating states:

Operating state 0: off position. No operation, with the clutch assembly 150 taking the load from the track tension. No valves active.

Operating state 1: With the clutch assembly 150 still taking the load from the track tension, the locking valve 250 is activated, setting it in the closed position. This stops hydraulic fluid draining from the first chamber 111, stopping the tensioner 100 from extending as pressure builds.

Operating state 2: The locking valve 250 remains activated, the second valve 230 is activated, linking the pump 211 to the second chamber 112. Pressure begins building in the second chamber 112 and rises until a predetermined pressure value is reached.

Operating state 3: The locking valve 250 remains closed, the second valve 230 remains activated, linking the pump to the second chamber 112, the third valve 240 is activated, linking the pump 211 to the clutch assembly 150. At this point the clutch assembly 150 is unloaded and is opened or disengaged. The load from the track transitions from the clutch assembly 150 to the hydraulic pressure in the second chamber 112. There will be a small amount of movement as the fluid reaches the required pressure to actuate the piston assembly 120. After the load from the track tension has been taken by the hydraulic pressure, the tensioner 100 will begin to extend.

Operating state 4: extension process. The locking valve 250 is de-activated and allowed to open, linking the first chamber 111 to the reservoir 213. The second and third valves 230, 240 remain activated.

Operating state 5: retraction process. Uses the second valve 230 to adjust the speed of retraction by venting and then pressuring quickly. The second valve 230 changes between linking the second chamber 112 to the pump and reservoir 211, 213 in order to control the speed of retraction. The third valve 240 is active.

Operating state 6: over retraction process. This pushes the tensioner past the point of engagement with the track and is used for maintenance and removal of the track. The second valve 230 is deactivated, linking the second chamber 112 to the reservoir 213, the third valve 240 is active, the first valve 220 is activated, linking the first chamber 111 to the pump 211 until the tensioner is completely retracted.

In typical operating mode, the tensioner 100 will be in operating state 0, with the hydraulics depressurised and all valves off. The tensioner 100 will be taking the load from the track tension mechanically via the clutch assembly 150.

As shown in FIG. 16, in preparation for an extension of the tensioner 100 (resulting in an increase in track tension) the tensioner 100 will proceed to move through operating states 1, 2 and 3 and then perform the extension operation (operating state 4) until the desired track tension is achieved, before proceeding through operating states 3, 2 and 1 to operating state 0.

In preparation for a retraction of the tensioner 100 (resulting in a decrease in track tension) the tensioner 100 will proceed through operating states 1, 2 and 3 and then perform the retraction operation (operating state 5) until the desired track tension is achieved, before proceeding through operating states 3, 2 and 1 to operating state 0.

In preparation for an over-retraction of the tensioner 100 (resulting in a relaxation of the track for maintenance or removal) the tensioner 100 will proceed through operating states 1, 2 and 3, perform the retraction operation (operating state 5), and then perform the over-retraction operation (operating state 6), and then proceed through operating states 3, 2 and 1 to operating state 0.

It will be appreciated that the above disclosure provides a number of advantages. The system is capable of automatic adjustment of tension, not requiring manual adjustment, and is able to be operated remotely from inside the vehicle. The system is also capable of active adjustment of track tension in response to operating conditions. By taking advantage of existing hydraulic circuits on the vehicle this system is also able to be retrofitted on existing vehicles in place of existing manually adjusted track tensioners. It will also be appreciated that the system uses hydraulics to both set and detect track tension. Furthermore, by providing an automated mechanical lock out, the system does not rely on the constant supply of hydraulic fluid to maintain tension, meaning that it is able to operate in high loads while also remaining energy efficient, only requiring hydraulic pressure to drive the piston assembly to a required position. Furthermore, the system is able to maintain track tension even in the event of hydraulic failure.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

For example, while in the embodiment shown a specific clutch arrangement is employed, it will be appreciated that any clutch arrangement or locking system capable of selectively allowing and preventing rotation of the locking spindle will be appropriate. For instance, in a further embodiment, the clutch arrangement may instead provide opposing frictional surfaces, biased into frictional engagement with an appropriate biasing means. In another embodiment, the two clutch portions may instead comprise a plurality of complimentary pins and sockets.

In a further example, while in the embodiment shown a specific mechanical engagement between the locking spindle and piston assembly is shown, it will be appreciated that any mechanical arrangement capable of converting the linear movement of the piston assembly to rotational movement of the locking spindle will be appropriate. For instance, in a further embodiment, this conversion may be achieved by virtue of a rack and pinion arrangement (where the axis of rotation of the locking spindle may be perpendicular to the direction of movement of the piston assembly) or a worm gear drive arrangement.

The invention claimed is:

1. A track tensioning system for adjusting tension in a vehicle track, the track tensioning system comprising:
   a hydraulic cylinder and a piston assembly slidably moveable within the hydraulic cylinder and dividing the hydraulic cylinder into a first chamber and a second chamber each in selective fluid communication with a pressurised hydraulic fluid source and reservoir, such that supply or withdrawal of hydraulic fluid to or from the first chamber and the second chamber causes the piston assembly to move within the hydraulic cylinder in either extension, increasing track tension, or retraction, decreasing track tension;
   a locking spindle rotatably secured with respect to the hydraulic cylinder and in mechanical engagement with the piston assembly, wherein movement of the piston assembly in extension causes the locking spindle to rotate in a first direction and movement of the piston assembly in retraction causes the locking spindle to rotate in a second direction; and
   a locking system capable of mechanically locking a position of the piston assembly with respect to the hydraulic cylinder, wherein the locking system is switchable between an engaged mode, where the locking system prevents movement of the piston assembly by preventing rotation of the locking spindle, thereby maintaining tension in the vehicle track, and a disengaged mode, where the locking system allows movement of the piston assembly by allowing rotation of the locking spindle, thereby allowing tension in the vehicle track to be adjusted.

2. The track tensioning system according to claim 1, wherein the piston assembly further comprises a piston rod having a first end operably connected to the piston assembly and a second end operably connected to a tensioning apparatus configured to bear against the vehicle track.

3. The track tensioning system according to claim 1, wherein the locking spindle further comprises an external engagement portion, wherein the external engagement portion can be rotated to manually extend or retract the piston assembly.

4. The track tensioning system according to claim 1, wherein an axis of rotation of the locking spindle and the direction of movement of the piston assembly are coincident.

5. The track tensioning system according to claim 1, wherein the locking spindle is in threaded engagement with the piston assembly by virtue of a threaded external section on the locking spindle and a threaded internal section in an internal bore of the piston assembly.

6. The track tensioning system according to claim 5, wherein the locking system comprises a clutch assembly moveable between an engaged position, preventing rotation of the locking spindle and a disengaged position, allowing rotation of the locking spindle.

7. The track tensioning system according to claim 5, wherein the locking spindle further comprises an external engagement portion, wherein the external engagement portion can be rotated to manually extend or retract the piston assembly.

8. The track tensioning system according to claim 5, wherein an axis of rotation of the locking spindle and the direction of movement of the piston assembly are coincident.

9. The track tensioning system according to claim 1, wherein the locking system comprises a clutch assembly moveable between an engaged position, preventing rotation of the locking spindle and a disengaged position, allowing rotation of the locking spindle.

10. The track tensioning system according to claim 9, wherein the locking spindle further comprises an external engagement portion, wherein the external engagement portion can be rotated to manually extend or retract the piston assembly.

11. The track tensioning system according to claim 9, wherein the clutch assembly is in selective fluid communication with the pressurised hydraulic fluid source and reservoir, such that supply and withdrawal of hydraulic fluid to or from the clutch assembly cause the clutch assembly to disengage and engage respectively.

12. The track tensioning system according to claim 9, wherein the clutch assembly comprises a first portion and a second portion, wherein the first portion is secured to and configured to rotate with the locking spindle and the second portion is prevented from rotating and moveable between engaged and disengaged positions, wherein when the first portion and the second portion are engaged, the locking spindle is prevented from rotating, and when the first portion and the second portion are disengaged, the locking spindle is allowed to rotate.

13. The track tensioning system according to claim 12, wherein the clutch assembly is in selective fluid communication with the pressurised hydraulic fluid source and reservoir, such that supply and withdrawal of hydraulic fluid to or from the clutch assembly cause the clutch assembly to disengage and engage respectively.

14. The track tensioning system according to claim 12, wherein the clutch assembly further comprises a biasing means, wherein the second portion is biased into mechanical engagement with the first portion by the biasing means.

15. The track tensioning system according to claim 14, wherein the clutch assembly is in selective fluid communication with the pressurised hydraulic fluid source and reservoir, such that supply and withdrawal of hydraulic fluid to or from the clutch assembly cause the clutch assembly to disengage and engage respectively.

16. The track tensioning system according to claim 14, wherein the first and second portions each comprise opposing teeth, configured to interengage and prevent relative rotation of the first portion and the second portion.

17. The track tensioning system according to claim 12, wherein the first portion and the second portion each comprise opposing teeth, configured to interengage and prevent relative rotation of the first portion and the second portion.

18. The track tensioning system according to claim 17, wherein the clutch assembly is in selective fluid communication with the pressurised hydraulic fluid source and reservoir, such that supply and withdrawal of hydraulic fluid to or from the clutch assembly cause the clutch assembly to disengage and engage respectively.

19. The track tensioning system according to claim 2, further comprising a locking spindle rotatably secured with respect to the hydraulic cylinder and in mechanical engagement with the piston assembly, wherein movement of the piston assembly in extension causes the locking spindle to rotate in a first direction and movement of the piston assembly in retraction causes the locking spindle to rotate in a second direction, and wherein the locking system selectively prevents and allows rotation of the locking spindle, thereby preventing and allowing movement of the piston assembly.

* * * * *